Dec. 22, 1959
A. L. LAMBERT
2,918,299
TRAIL CART
Filed Nov. 28, 1956
2 Sheets-Sheet 1
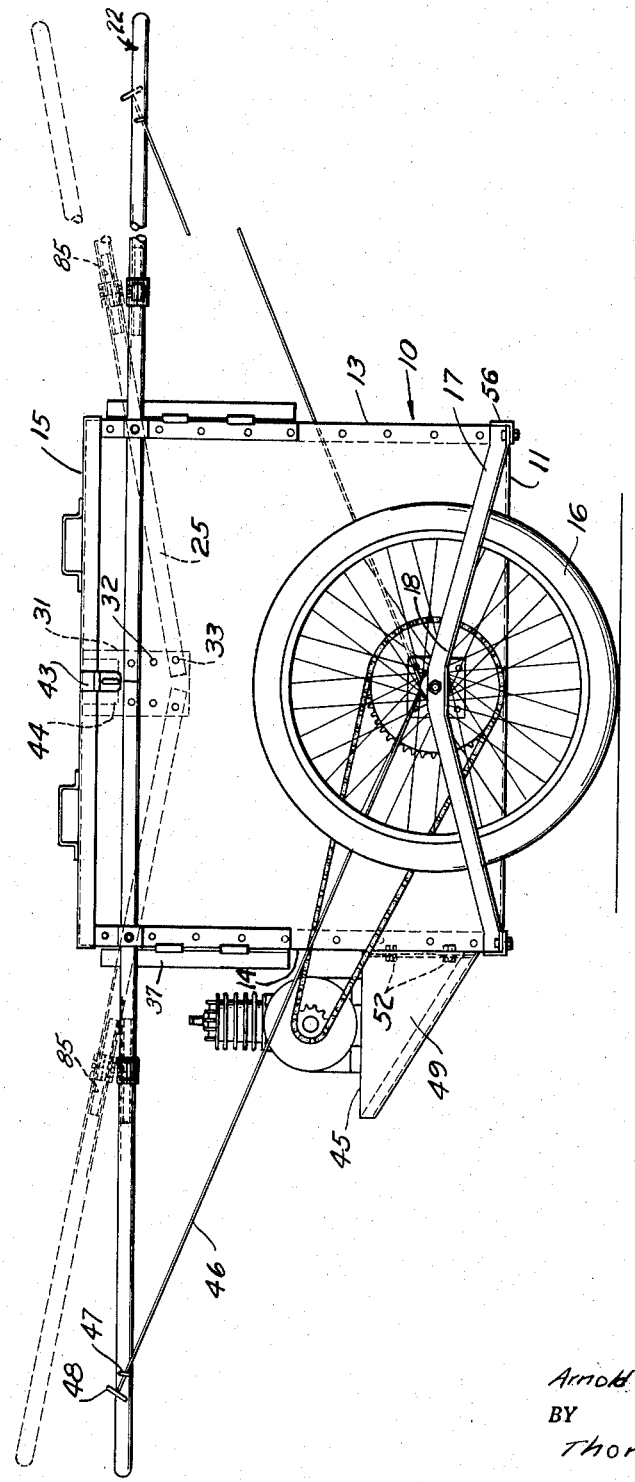
INVENTOR.
Arnold L. Lambert
BY
Thomas W. Secrest
ATTORNEY Dec. 22, 1959
A. L. LAMBERT
2,918,299
TRAIL CART
Filed Nov. 28, 1956
2 Sheets-Sheet 2
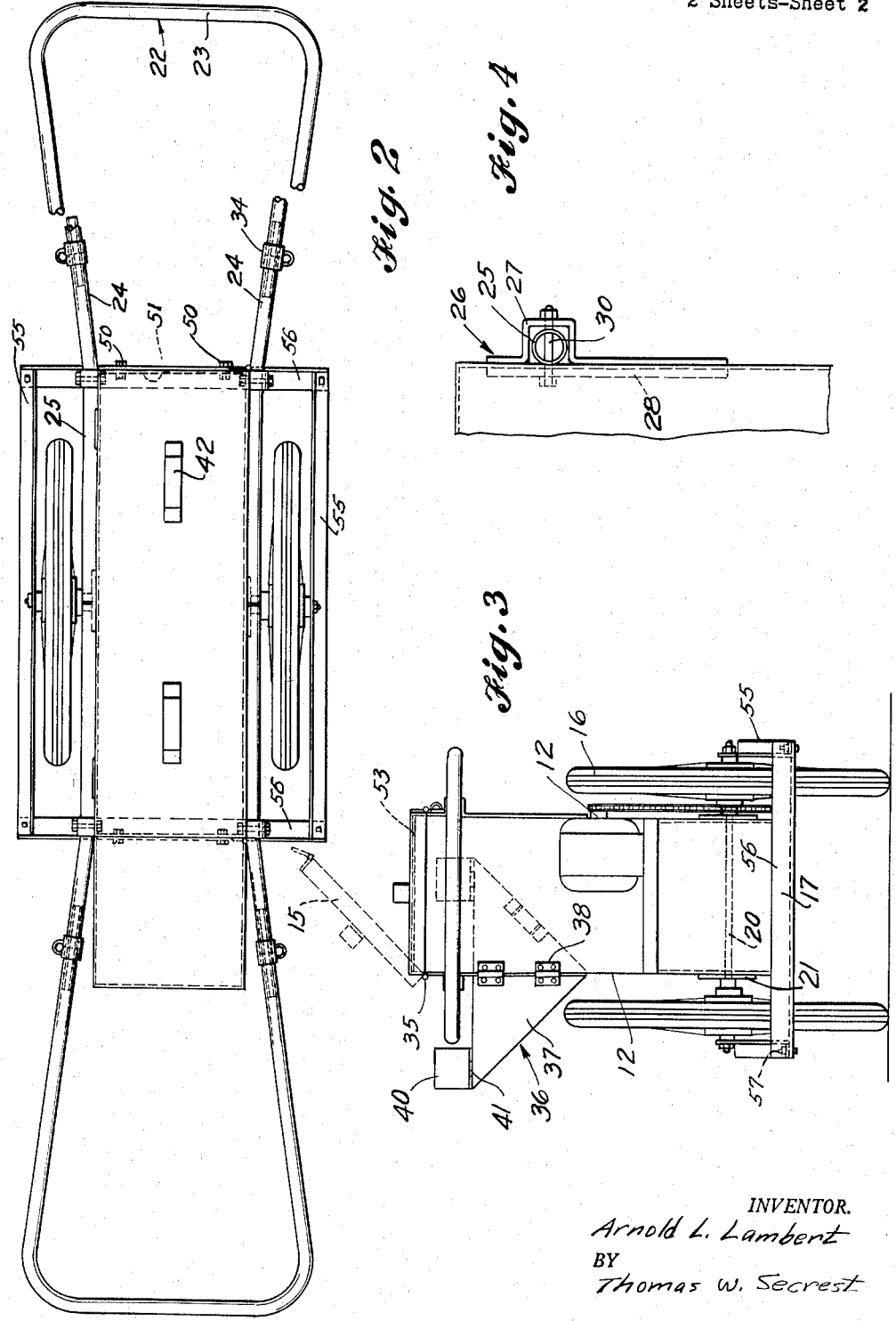
INVENTOR.
Arnold L. Lambert
BY
Thomas W. Secrest
ATTORNEY

United States Patent Office 2,918,299
Patented Dec. 22, 1959

2,918,299

TRAIL CART

Arnold L. Lambert, Bremerton, Wash.

Application November 28, 1956, Serial No. 624,898

3 Claims. (Cl. 280—47.26)

This invention relates to a trail cart and more particularly, to a cart which may be used for transporting camping goods in hilly and mountainous terrain wherein the trails are of a relatively narrow width and quite often of a steep incline.

An object of this invention is the provision of a trail cart having at least two wheels for support and balance and which two wheels are relatively close together so as to be able to travel over narrow, hilly and mountainous trails.

Another object is the provision of a trail cart having relatively large wheels so that the cart will be able to easily negotiate ruts and small objects such as branches and little logs on the trail.

A further object is the provision of a cart having a relatively large storage space with respect to the restrictions upon the configuration of the same.

A still further and important object is the provision of a cart having a cover for its carrying chest and which cover can be rotated to function as a supporting ledge along the side of the chest.

An additional object is the provision of a trail cart having handles on each end of the cart and which handles are pivoted to the chest so as to be easily raised and lowered for convenience in pushing the cart over trails of different inclines.

Other objects and advantages will be apparent in the following description of an embodiment of the invention, and the novel features will be specifically pointed out here and after in the appending claims.

In the accompanying drawings:

Figure 1 is a fragmentary side elevation of a specific embodiment of the invention constructed in accordance with the preferred teachings thereof and illustrates in phantom the handles of adjustable inclination.

Fig. 2 is a fragmentary plan view of the trail cart and further illustrates the manner of construction of the same.

Fig. 3 is an end elevational view of the trail cart and illustrates in phantom a manner in which the cover for the chest is swung open so as to be supported along the side of the chest; and, Fig. 4, on an enlarged scale, is a fragmentary end elevational view of the chest of the trail cart and illustrates the manner of pivoting the handle to the chest.

Prior to discussing the invention proper in regard to the manner of construction a brief word will be mentioned as to the use of the same. The invention is a trail cart having a chest for carrying camping equipment and the like. The width of the chest is relatively narrow so as to allow the cart to be used in mountainous terrain and hilly country where the trails are generally of a restricted width. Also, in this regard the wheels are of a relatively large diameter thereby making it easy for the cart to negotiate ruts and obstructions on the trail. The handles are pivoted to the cart and are of an adjustable height or inclination so that the person pushing or pulling the cart can move the same with relative ease over either an inclined trail or a trail which is substantially horizontal.

Referring to the drawings it is seen that the invention, a trail cart 10, comprises a chest having a bottom 11, sides 12, an end 13, an end 14 and a cover 15. Referring to the drawings it is seen that the width of the trail cart is relatively narrow in proportion to its length, i.e., the sides 12 are approximately three times as long as the ends 13 and 14 are wide. Also, the length of the chest is slightly greater than the height. There are two wheels 16 for this cart with a wheel being on each side of the chest. The chassis comprises the chest and a circumscribing guard rail 17 running along the outside of the cart. It comprises a section 55 on each side of the chest parallel thereto and spaced apart therefrom, and a section 56 on each end of the chest. The section 56 is attached to the ends of the chest by bolts 50 and a tapping strip 51 which is on the inside of the chest. As is evidenced by the drawings the section 56 projects beyond the wheels 16. The section 55 runs parallel to the chest and outside of the wheels. The portion along the sides of the chest bends upwardly into a bow 18, the end of this bow being bolted by bolt 57 to the section 56. These sections of the guard rail are of angle iron. The center section of this bow 18 is of a sufficient height to receive the end of an axle 20 running through the lower part of the chest. This axle is journaled into or bears against the bearing 21 attached to the outside face of the sides 12 near the lower edge and substantially the center of the same. This bearing is in the form of a plate which is tack welded or bolted to the side 12. In turn the wheels are journaled onto the shaft 20 and rotate on the same. Naturally, on the ends of the shaft there are nuts screwed onto the shaft to keep the wheels in position between the guard rail and the side 12. The rail 17 in addition to functioning as part of the chassis also acts as a guard for the wheels and the cart so as to clear underbrush away from the wheels upon moving over the trail. This guard rail is of angle iron.

For ease in maneuvering the trail cart there are provided handles 22. These handles are of a modified U-configuration having a base 23 and legs 24. Each of these legs 24 upon leaving the base 23 curves inwardly toward the other leg until about a distance midway between the end of the leg and the base 23 the two legs straighten out in a section 25 so as to become parallel to each other. The straight section 25 runs along the side 12 and near the upper edge of the same. These legs are pivoted to the carrying chest on each side and at substantially the end of the side. More particularly, there is provided a bracket 26 for this pivoting function. This bracket has a U-configuration 27 or a jog so that when the same is flush against the side 12 there is provided an opening through which the leg 25 passes. The bracket 26 can be tack welded to the side 12. On the inside of the chest and opposite the bracket 26 is located a reinforcing plate 28. Passing through the reinforcing plate 28 and the U or jog of the bracket is a bolt 30. This bolt 30 also passes through an opening in the straight section 25 of the leg. As is appreciated this bolt 30 makes it possible to pivotly rotate the handle 22 up and down. Naturally, there is a nut on the bolt for keeping the bolt securely in position. On the inner end of the straight section 25 there is a means for pivotally attaching the handle 22 to the side of the cart. Specifically, in the upper central portion and on the inside of the side 12 there is a bracket 31. Projecting through the side 12 and attached to this bracket 31 are a series of pins 32. On the inner end of the leg 25 is an opening 33 for co-registering with and fitting over one of these pins 32 so as to receive the same. Because of the flexibility of the arm 22 the same may be pulled away from the side 12, rotated with respect to the bolt 30 and then snapped in place over one of the pins 32. When both of the legs on one handle are so moved it is seen that the handle is rotated either up or down so as to make it easier to grasp the same for a trail of a particular incline. The handle is not a continuous integral tube but comprises the U-portion with the inclined legs 24 and another portion comprising mainly the straight section 25. The inclined leg 24 and the straight section 25 are joined by a clamping sleeve 34 having a bolt 54. For reinforcing and strengthening purpose there is a tube 85 of smaller diameter than and inside of the tube 23. Tube 85 is integral with the tube 23 and in operative position projects into the handle 24.

Returning now to the cover the same is pivoted to the side by a hinge 35 along the upper edge of said side. This hinge makes it possible to swing the cover open along the side of the carrying chest. However, this cover also serves a useful purpose as a supporting ledge. More particularly, there is provided a support 36 having a triangular shaped member 37 pivoted by hinges 38 to the ends 14 and 13 of the chest. A supporting ledge 40 is hinged to this support at 41 along the side 12 of the chest so as to support the cover 15 upon being swung open. In this manner there is provided a means to support the cover in a substantially horizontal position when the cart is in a horizontal position. In this position the cover 15 serves as a support for food, camping equipment, clothing and blankets. Auxiliary to this cover there are two handles 42 on the upper face of the same and a locking means comprising a hasp 43 along one side of the cover. This hasp 43 coacts with a keeper 44 at the top central portion of the chest. Also, inside of the cover and underneath the upper surface is a sheet of material 53 such as plywood. This sheet can be removed and also used as a support for food and utensils.

On the end 14 of the chest there is provided a motor support 45, as in certain instances it may be desirable to provide a motor for moving the cart on the trail. Such a motor can be a small one and one-half horse power gasoline powered engine. This motor support comprises a ledge supported on its side and underneath part by legs 49. These legs may be sheet metal or angle iron. This support is attached to the end 14 by bolts 52 which pass through the wall of the chest. On motor shaft 60 is a driving sprocket 61. Attached to shaft 20 between the wheels 16 and the side of the chest is a driven sprocket 62. Interconnecting these two sprockets is a chain 63 for transmitting force from the sprocket 61 to the sprocket 62.

Reference numeral 46 denotes a brake cable running from the handle 22 to a brake on the wheel. On the handle there is a keeper 47 through which the brake cable passes and a clasping means 48 on the free end of the cable 46. From the drawings it is seen that there are two such cables so that a person on either end of the cart can apply the brake if necessary.

Referring to the materials of construction for this trail cart it is realized that the chest 10 may be made of galvanized steel such as 0.019 inch thickness. Such a thickness provides a material of sufficient strength for the purpose of the chest and yet light in weight to be easily moved. The wheels are obtainable in commerce and a suitable source may be bicycle wheels and tires. For example, the wheels may be of twenty-six inches in diameter. With the wheel of this diameter ruts in the trail, small logs and rocks can easily be traversed. The motor mount may be of a heavier galvanized steel than the chest such as 0.038 inch galvanized steel. The handle supports 26 are of flat bar steel, and the brake line may be of chain, piano wire, nylon cord, or any other suitable material. The inside of the cover 15 may be of galvanized steel or else of plywood so as to give a more finished appearance. And, the shaft for the wheels may be of steel rods threaded on the outer ends.

From the above description of my invention it is seen that the "Trail Cart" can be dismounted and stored inside the chest for storage or transportation when not in use. More specifically, it is seen that the handles 23 can be dismounted and taken apart with the removal of union 34 and then these handles stored inside of the chest. Also, if necessary, the wheels can be removed and also stored inside of the chest. In this configuration the "Trail Cart" occupies a minimum of space and can be stored in the trunk of a modern car or on a car rack on top of a car.

It will be understood that various changes in the details, materials and arrangements of parts, which have herein been described and illustrated in order to explain the nature of the invention, may be made by those skilled in the art within the principle and scope of the invention as expressed in the appended claims.

I claim:
1. A trail cart comprising a relatively high, narrow chest having a transverse axle secured thereto, a pair of wheels on said axle, one on either side of said chest, a generally U-shaped handle having a bight portion and two legs, means pivotally securing said legs at a mid-part thereof to the chest, one leg to each side of the chest, a series of horizontal pins extending outwardly from each side of said chest, said pins all being equidistant from the axis of said securing means, said legs of said handle being resilient and each having an aperture therein adjacent the end thereof, whereby said apertures may be placed selectively on said pins to alter the position of said handle by springing said legs outwardly between said securing means and the free ends thereof.

2. A trail cart as in claim 1 wherein there are a pair of such handles so secured to said chest, one of said handles to one end of said chest and the other said handle to the other end of said chest, and two such series of pins, one for each handle.

3. The trail cart of claim 2 further comprising a brake operatively connected to at least one of said wheels, a first operating member extending from said brake and supported on one of said handles, and a second operating member extending from said brake and supported on the other of said handles.

References Cited in the file of this patent

UNITED STATES PATENTS

| | | |
|---|---|---|
| 123,707 | Kind | Feb. 13, 1872 |
| 772,253 | Ray | Oct. 11, 1904 |
| 1,180,225 | Bamman et al. | Apr. 18, 1916 |
| 1,455,395 | Exum | May 15, 1923 |
| 1,513,469 | Robinson | Oct. 28, 1924 |
| 1,585,834 | Drinkwater | May 25, 1926 |
| 2,253,288 | De Lucchi | Aug. 19, 1941 |

FOREIGN PATENTS

| | | |
|---|---|---|
| 76,392 | Norway | Mar. 6, 1950 |
| 185,014 | Switzerland | Feb. 16, 1937 |